(12) United States Patent
Roehm

(10) Patent No.: US 8,807,239 B2
(45) Date of Patent: Aug. 19, 2014

(54) HANDHELD POWER TOOL HAVING A SWITCHABLE GEAR

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 13/119,840

(22) PCT Filed: Aug. 12, 2009

(86) PCT No.: PCT/EP2009/060426
§ 371 (c)(1),
(2), (4) Date: May 17, 2011

(87) PCT Pub. No.: WO2010/034563
PCT Pub. Date: Apr. 1, 2010

(65) Prior Publication Data
US 2011/0214891 A1 Sep. 8, 2011

(30) Foreign Application Priority Data

Sep. 25, 2008 (DE) .......................... 10 2008 042 354

(51) Int. Cl.
*B25F 5/00* (2006.01)
(52) U.S. Cl.
USPC ............. 173/47; 173/176; 173/179; 173/216; 173/217; 475/269

(58) Field of Classification Search
USPC ............ 173/47, 176, 179, 216, 217; 475/269, 475/298, 317; 74/625, 321, 335
See application file for complete search history.

(56) References Cited

U.S. PATENT DOCUMENTS

| 5,550,416 A * | 8/1996 | Fanchang et al. ................ 310/83 |
| 7,044,882 B2 * | 5/2006 | Eisenhardt ..................... 475/298 |
| 2011/0220377 A1 * | 9/2011 | Roehm ........................... 173/47 |

FOREIGN PATENT DOCUMENTS

| CN | 1781675 | 6/2006 |
| DE | 10 2004 058 809 | 6/2006 |
| JP | 2001 088051 | 4/2001 |

* cited by examiner

*Primary Examiner* — Michelle Lopez
(74) *Attorney, Agent, or Firm* — Kenyon & Kenyon LLP

(57) ABSTRACT

A handheld power tool has a switchable gear having at least two gear stages which are engaged via an adjustable switching member, the switching member being held in a latching position with a latching member in a first gear stage and in an unlatched position in a second gear stage. The latching member is rotatably mounted in the housing within a limited angular section between two end stop positions.

19 Claims, 2 Drawing Sheets

HANDHELD POWER TOOL HAVING A SWITCHABLE GEAR

FIELD OF THE INVENTION

The present invention relates to a handheld power tool having a switchable gear.

BACKGROUND INFORMATION

A handheld power tool designed as a cordless screwdriver, which is equipped with an electric drive motor which drives a rotatably mounted tool receptacle for receiving a tool via a multistage planet gear, is discussed in DE 10 2004 058 809 A1.

Planet gears of this type may usually be switched between two gear stages having a slow rotational speed and high torque or having a higher rotational speed and lower torque. A slide switch manually adjusts an annulus wheel in the axial direction between a latched position having a latching disk fixed in a housing and an unlatched position, the annulus gear wheel being rotationally connected to a sun wheel of the planet gear in such a way that the annulus gear wheel is also fixedly coupled with the housing in the latched position and the annulus gear wheel may rotate in the unlatched position. When adjusting between the latched and unlatched positions, the annulus gear wheel is abruptly accelerated or braked. The switching operation may not be reliably carried out under load; in this case, the operator must turn the handheld power tool off and then on again, the switching operation not being completed until a restart.

SUMMARY OF THE INVENTION

An object of the exemplary embodiments and/or exemplary methods of the present invention is to provide a handheld power took having a multistage gear which is switchable between at least two gear stages, using simple structural means, in such a way that it is possible to reliably change between the gear stages under different operating conditions, in particular under load, and at reduced component stress.

This object is achieved according to the exemplary embodiments and/or exemplary methods of the present invention by the features described herein. The further embodiments described herein specify advantageous refinements.

The handheld power tool according to the present invention is equipped with a switchable, multistage gear which has at least two gear stages which may be activated, i.e., engaged via an adjustable switching member. In a first gear stage, the switching member is in a latched position with a latching member; in a second gear stage, on the other hand, the switching member is in an unlatched position with the latching member. The different gear stages of the gear are assigned to the latched position and the unlatched position of the switching member. The switching member acts upon a gear component which accommodates the different gear stages when the switching member is adjusted between the latched and unlatched positions.

In the exemplary embodiment according to the present invention, the latching member is mounted in the housing within a limited angle segment between two end stop positions in such a way that it is able to rotate around the rotation axis of the tool. In contrast to embodiments according to the related art, the non-rotational connection of the latching member to the housing is canceled at least to the extent that a rotation of the latching member between the two end stop positions is enabled, so that the latching member may change its angular position between these two end stop positions. In an exemplary embodiment, each of these end stop positions is assigned to a latched position or to an unlatched position and thus also to a particular gear stage. To change the gear stage, the latching member executes a limited angular rotation, so that, for example when moving from the unlatched position to the latched position, the latching member undergoes a rotational acceleration and thus a continuous change in rotational angular velocity until it reaches the diametrically opposed end stop position and, in contrast to the related art, no abrupt coupling, accompanied by a jerk, of the gear component occurs between standstill and rotation. This advantage takes effect when the latching member moves from the latched position to the unlatched position as well as in the opposite direction, i.e., both when changing from the first gear stage to the second gear stage and from the second gear stage to the first gear stage. Furthermore, a gear change is made possible, in particular when the handheld power tool is under load, without this resulting in an impermissibly high stress on the component.

The end stop positions are advantageously implemented by stops on the latching member and on the housing of the handheld power tool. A single stop, which must be brought into the stop position with the housing stop, is suitably provided on the latching member. It may be advantageous for the latching member stop to come into contact with diametrically opposed sides of the housing stop in both end stop positions, so that the latching member may execute an angular rotation of 360°, minus the angular segment accommodated by the housing stop, for the purpose of moving between the two end stop positions. In an appropriately narrow design of the stop on the housing side, the latching member may thus change its angular position by approximately 360°; the latching member is adjusted to the maximum degree over this angle difference when moving from the first gear stage to the second gear stage or in the opposite direction.

According to a further embodiment, it is provided that force is applied to the latching member by at least one elastic element in a starting angular position. This starting angular position is advantageously located between the end stop positions, in particular in the middle between the end stop positions, so that the latching member must bridge the same angle difference in both directions until reaching the stop on the housing side when in the unloaded state. In each of the stop positions, the latching member is subjected to a resetting force in the direction of the starting angular position.

For adjusting between the latched position and the unlatched position, the switching member, which must be brought into the latched position with the latching member, suitably executes an axial adjusting movement. If, for example, the latching member has an annular design in the form of a latching ring, this is achieved by the fact that latching elements on the latching ring are brought into the latched position with corresponding latching elements on the switching member, due to the axial adjusting movement. The latching elements on the latching ring may be located in the area of an end face of the latching ring.

According to a further embodiment, the gear is a planet gear which has at least a one-stage design, if necessary also a two-stage or three-stage design, and which has at least one first gear stage and one second gear stage having different transmission and torque ratios, it being necessary to switch between the first and second gear stages with the aid of the switching member. The planet gear includes at least one sun wheel and at least one annulus gear wheel which encloses the planet wheels. In the first gear stage, the annulus gear wheel is coupled with the latching member via the switching member; in the second gear stage, the annulus gear wheel is decoupled from the latching member. The switching member may be configured as an annulus wheel which suitably surrounds the annulus gear wheel and is coupled with the annulus gear wheel in the direction of rotation. In the latched position, the annulus gear wheel is coupled with the latching ring via the annulus wheel, the latching ring assuming a fixed position on the housing upon reaching the end stop position, so that the annulus gear wheel also occupies a fixed position on the housing and is unable to rotate. In the unlatched position, on the other hand, the latched connection to the latching ring is canceled, so that the annulus gear wheel is able to rotate at the same rotational speed as the sun wheel.

According to a further suitable embodiment, it is provided that the annulus wheel and the annulus gear wheel form a joint, one-part component. This embodiment is characterized by a particularly compact design.

It is furthermore possible to combine the latching ring with a further annulus gear wheel ($3^{rd}$ stage) to form a one-part component, in this case the third-stage annulus gear wheel being rotatably mounted in a housing which moves against an elastic force.

Additional advantages and suitable embodiments are further described herein, including in the description of the figures and the drawings.

DETAILED DESCRIPTION

Figure 1:
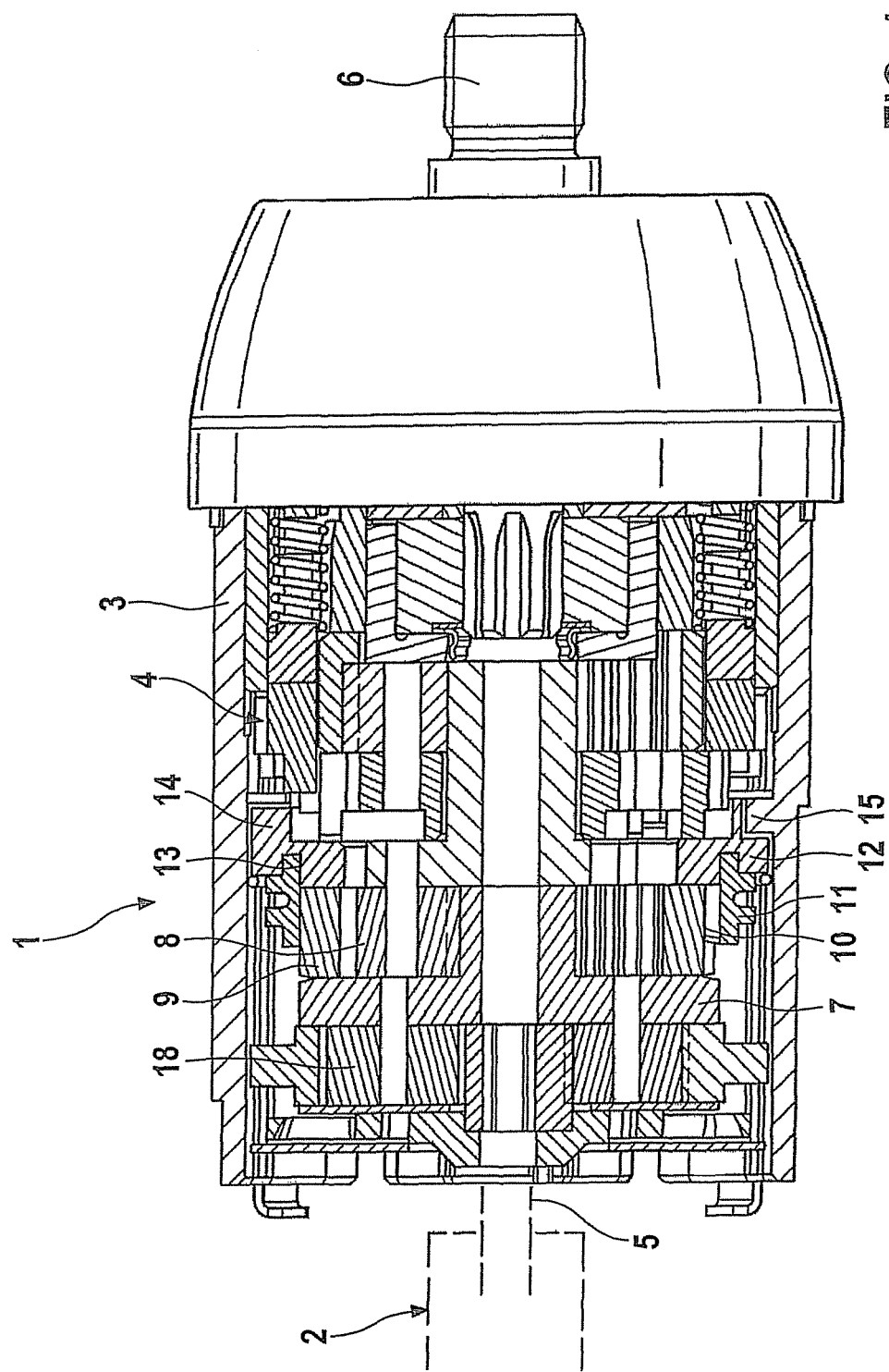
FIG. 1 shows a section in the longitudinal direction of a handheld power tool in the area of a switchable gear, which is designed as a planet gear, an annulus wheel, which is rotationally coupled with an annulus gear wheel of the planet gear being axially adjusted between a latched position with a latching ring and an unlatched position for the purpose of switching between two gear stages.

In the figures, identical components are provided with identical reference numerals.

The handheld power tool 1 illustrated in FIG. 1 is, for example, a cordless screwdriver or a cordless drill. Handheld power tool 1 includes an electric drive motor 2, which is illustrated only as an outline, in a housing 3, motor shaft 5 of drive motor 2 driving a planet gear 4 in housing 3, planet gear 4 being rotationally coupled with a tool receptacle part 6. Planet gear 4 has a three-stage design and includes two gear stages, it being possible to switch back and forth between the gear stages to change the step-down and torque ratios.

Planet gear 4 includes a sun wheel (stage 1) 7, which carries planet wheels 18. An annulus gear wheel (stage 2) 9, which surrounds planet wheels 8 and is rotationally coupled with an annulus wheel 11 via an engaging gearing 10, is assigned to planet gear 4, annulus wheel 11 being able to execute an axial adjusting movement relative to housing 3. Annulus wheel 11 is axially adjusted between a latched position and an unlatched position, a rotationally fixed coupling to a latching ring 12 mounted on the housing side being provided via a locking geometry 13 in the latched position. In the illustrated example, locking geometry 13 and engaging gearing 10 have an identical design. In the latched position, annulus gear wheel 9 is thus also fixedly connected to latching ring 12 on the basis of engaging gearing 10. In the unlatched position, on the other hand, annulus wheel 11 is removed from latching ring 12 in the axial direction, so that the latch connection is canceled. In the unlatched position, the annulus gear wheel, including the annulus wheel, is rotationally coupled with sun wheel 7, and it rotates relative to the housing at the same rotational speed as the sun wheel.

Figure 2:
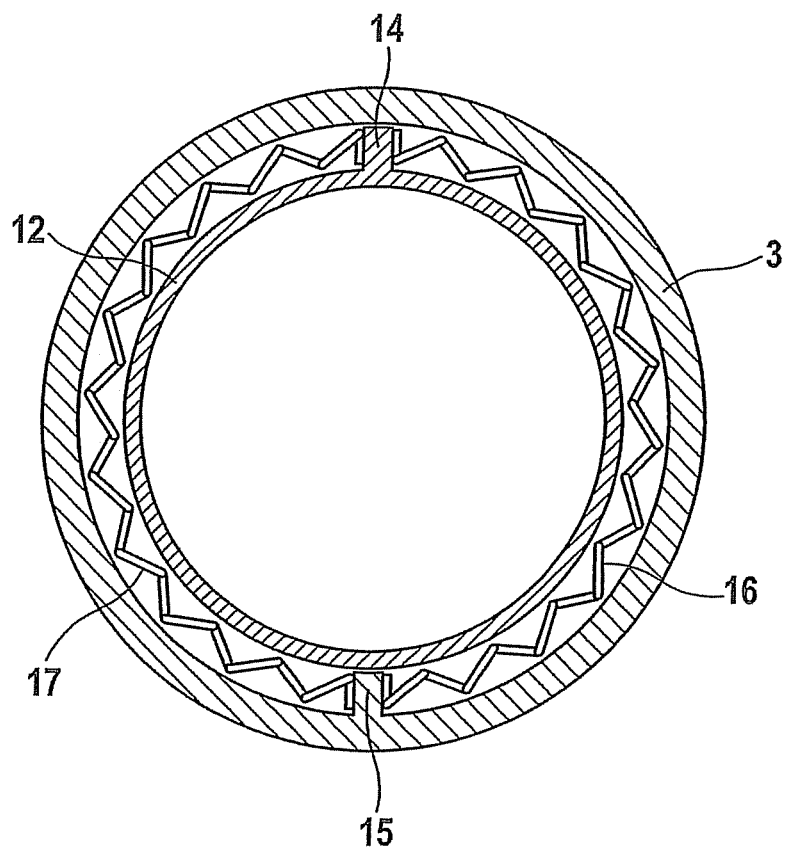
FIG. 2 shows a cross-section (of FIG. 1) that is perpendicular to the longitudinal or shaft axis of the handheld power tool in the area of the latching ring.

As shown in FIG. 1 in connection with FIG. 2, latching ring 12 is mounted rotationally relative to housing 3, but only within a limited angular section between two end stop positions, which are defined by a latching member stop 14 on latching ring 12 and a housing stop 15 on housing 3. Latching ring 12 is held in a starting angular position relative to housing 3 by two elastic elements 16 and 17, in which position latching member stop 14 is diametrically opposed to housing stop 15, so that latching ring 12 may execute a change in angle of approximately 180° in both directions. Thus, the entire change in angle which latching ring 12 may execute is approximately 360°. In the end stop positions, latching member stop 14 is in contact with diametrically opposed sides of housing stop 15.

The change in the rotational angular position of latching ring 12 enables latching ring 12 to execute a rotational movement of approximately 180° until reaching the end stop position when the gear stage is changed, if annulus wheel 11 is to be brought into the latched position with latching ring 12, starting from the middle starting angular position, which is illustrated in FIG. 2. As a result, the coupling operation is not abrupt, but instead the latching ring, including the annulus wheel to be brought into the latching position, is accelerated against the force of one of elastic elements 16 or 17, so that a torque shock produced thereby is reduced for both the operator and for the mechanical components in the handheld power tool, due to the elastic element deflection. This also reduces wear on the locking geometry. Furthermore, a gear preselecting spring for the annulus wheel may be dispensed with, which is otherwise required according to the related art for applying force from the switching ring gear against the latching ring in the axial direction.

Elastic elements 16 and 17 are advantageously designed as metal springs. However, an embodiment in the form of a viscoelastic rubber component or a plastic component is also possible.

What is claimed is:

1. A handheld power tool, comprising:
    a housing;
    a latching member, which is connected to the housing and rotatably mounted in the housing within a limited angle section between two end stop positions and which has latching elements; and
    a switchable gear having at least two gear stages, which are engaged via an adjustable switching member having latching elements, wherein in a first gear stage, the latching elements of the switching member are in a latched position with the latching elements of the latching member, and wherein the latching elements of the switching member are in an unlatched position with the latching elements of the latching member in a second gear stage.

2. The handheld power tool of claim 1, wherein a latching member stop, which lies against different sides of a housing stop in the end stop positions, is situated on the latching member.

3. The handheld power tool of claim 1, wherein force is applied to the latching member by at least one elastic element in a starting angular position.

4. The handheld power tool of claim 3, wherein the starting angular position lies between the end stop positions.

5. The handheld power tool of claim 3, wherein force is applied to the latching member by two elastic elements in the starting angular position, which lies between the end stop positions.

6. The handheld power tool of claim 1, wherein the switching member is adjusted between its switching positions in the axial direction.

7. The handheld power tool of claim 1, wherein the gear is a planet gear which includes a sun wheel and a annulus gear wheel, wherein the annulus gear wheel is coupled with the latching member via the switching member in the first gear stage, and wherein the annulus gear wheel is decoupled from the latching member in a second gear stage.

8. The handheld power tool of claim 7, wherein the switching member is guided in an axially adjustable manner on the outside of the annulus gear wheel.

9. The handheld power tool of claim 7, wherein the switching member and the annulus gear wheel form a joint, one-piece component.

10. The handheld power tool of claim 7, wherein an annulus wheel surrounds the annulus gear wheel.

11. The handheld power tool of claim 1, wherein the switching member is configured as a switching ring gear.

12. The handheld power tool of claim 1, wherein the latching member is configured as a latching ring.

13. The handheld power tool of claim 1, wherein the housing stop is integral with the housing.

14. The handheld power tool of claim 1, wherein the two end stop positions are defined by a latching member stop on the latching member and a housing stop on the housing.

15. The handheld power tool of claim 14, wherein the latching member is held in a starting angular position relative to the housing by two elastic elements, in which position the latching member stop is diametrically opposed to the housing stop.

16. A handheld power tool, comprising:
a housing;
a latching member, which is connected to the housing and rotatably mounted in the housing within a limited angle section between two end stop positions; and
a switchable gear having at least two gear stages, which are engaged via an adjustable switching member, wherein in a first gear stage, the switching member is in a latched position with the latching member, and wherein the switching member is in an unlatched position with the latching member in a second gear stage,
wherein a latching member stop, which lies against different sides of a housing stop in the end stop positions, is situated on the latching member.

17. The handheld power tool of claim 16, wherein the latching member stop is a single stop.

18. The handheld power tool of claim 16, wherein the housing stop is a single stop.

19. The handheld power tool of claim 16, wherein the latching member stop is integral with the latching member.

* * * * *